(12) United States Patent
Iwasa et al.

(10) Patent No.: US 8,176,043 B2
(45) Date of Patent: May 8, 2012

(54) RANKING SEARCH RESULTS

(75) Inventors: Ken Iwasa, Rockville, MD (US); Seth Michael Murray, Redwood City, CA (US); Goldee Udani, Gujart (IN)

(73) Assignee: Comcast Interactive Media, LLC, Philadelphia, PA (US)

( * ) Notice: Subject to any disclaimer, the term of this patent is extended or adjusted under 35 U.S.C. 154(b) by 482 days.

(21) Appl. No.: 12/402,897

(22) Filed: Mar. 12, 2009

(65) Prior Publication Data

US 2010/0235351 A1   Sep. 16, 2010

(51) Int. Cl.
G06F 7/00 (2006.01)
(52) U.S. Cl. ......... 707/723; 707/737; 707/752; 709/217
(58) Field of Classification Search .................. 707/723
See application file for complete search history.

(56) References Cited

U.S. PATENT DOCUMENTS

| | | |
|---|---|---|
| 5,521,841 A | 5/1996 | Arman et al. |
| 2003/0163443 A1 | 8/2003 | Wang |
| 2003/0195877 A1 | 10/2003 | Ford et al. |
| 2006/0167859 A1 | 7/2006 | Verbeck et al. |
| 2007/0156677 A1 * | 7/2007 | Szabo .............................. 707/5 |
| 2007/0211762 A1 | 9/2007 | Song et al. |
| 2007/0214123 A1 | 9/2007 | Messer et al. |
| 2007/0214488 A1 | 9/2007 | Nguyen et al. |
| 2007/0260700 A1 | 11/2007 | Messer |
| 2008/0133504 A1 | 6/2008 | Messer et al. |
| 2008/0163328 A1 | 7/2008 | Philbin et al. |
| 2008/0183681 A1 | 7/2008 | Messer et al. |

OTHER PUBLICATIONS

Extended European Search Report and Search Opinion for European application No. 10155340.
Messer, Alan et al., "SeeNSearch: A Context Directed Search Facilitator for Home Entertainment Devices", Paper, Samsung Information Systems America Inc., San Jose, CA.

(Continued)

*Primary Examiner* — Fazlul Quader
(74) *Attorney, Agent, or Firm* — Banner & Witcoff, Ltd.

(57) ABSTRACT

Content items and other entities may be ranked or organized according to a relevance to a user. Relevance may take into consideration recency, proximity, popularity, air time (e.g., of television shows) and the like. In one example, the popularity and age of a movie may be used to determine a relevance ranking. Popularity (i.e., entity rank) may be determined based on a variety of factors. In the movie example, popularity may be based on gross earnings, awards, nominations, votes and the like. According to one or more embodiments, entities may initially be categorized into relevance groupings based on popularity and/or other factors. Once categorized, the entities may be sorted within each grouping and later combined into a single ranked list.

38 Claims, 10 Drawing Sheets

U.S. PATENT DOCUMENTS

| | | |
|---|---|---|
| 2008/0183698 A1 | 7/2008 | Messer et al. |
| 2008/0204595 A1 | 8/2008 | Rathod et al. |
| 2008/0208796 A1 | 8/2008 | Messer et al. |
| 2008/0208839 A1 | 8/2008 | Sheshagiri et al. |
| 2008/0221989 A1 | 9/2008 | Messer et al. |
| 2008/0222106 A1 | 9/2008 | Rao et al. |
| 2008/0235209 A1 | 9/2008 | Rathod et al. |
| 2008/0235393 A1 | 9/2008 | Kunjithapatham et al. |
| 2008/0250010 A1 | 10/2008 | Rathod et al. |
| 2008/0256097 A1 | 10/2008 | Messer et al. |
| 2008/0266449 A1 | 10/2008 | Rathod et al. |
| 2008/0288641 A1 | 11/2008 | Messer et al. |
| 2009/0204599 A1 * | 8/2009 | Morris et al. .................... 707/5 |

OTHER PUBLICATIONS

Smith, J.R. et al. "An Image and Video Search Engine for the World-Wide Web" Storage and Retrieval for Image and Video Databases 5, San Jose, Feb. 13-14, 1997, Proceedings of SPIE, Belingham, Spie, US, vol. 3022, pp. 84-95.

Kontothoanassis, Ledonias et al. "Design, Implementation, and Analysis of a Multimedia Indexing and Delivery Server", Technical Report Series, Aug. 1999, Cambridge Research Laboratory.

Partial European search report for Application No. 10155340.2, mailed Jul. 12, 2010, 6 pages.

* cited by examiner

| Case | releaseDateWeight |
|---|---|
| (The present year - 1) or later | 1.0 |
| (The present year - 10) through (the present year - 2) | 0.8 |
| (The present year - 20) through (the present year - 11) | 0.6 |
| before (the present year - 20) | 0.4 |

FIG. 7

| Case | Role Recency Factor |
|---|---|
| (the present year - 1) or later | 2.5 |
| (the present year - 2) through (the present year - 1) | 2.0 |
| (the present year - 3) through (the present year - 2) | 1.5 |
| (the present year - 4) through (the present year - 3) | 1.25 |
| before (the present year - 4) | 1.0 |

FIG. 8

| 900 | |
|---|---|
| LIST1 CAST ORDER VALUE IS [1, 3] | 1 |
| ON LIST1, CAST ORDER VALUE > 3 | 0.1 |
| ON LIST2, NOT ON LIST1 | 0.15 |
| ON LIST1, CAST ORDER = 0 | 0.2 |
| OTHERS | 0.4 |

FIG. 9

RANKING SEARCH RESULTS

TECHNICAL FIELD

Aspects of the invention relate to ranking a set of items. In particular, aspects described herein relate to the ranking of content items based on relevance.

BACKGROUND

The amount of available information and content that may be accessed through user devices such as computers, set-top boxes, cell phones and the like has become staggering. To find information or content that a user is interested in, users will often submit search queries to obtain a condensed list of potentially matching or relevant results. In some instances, however, such result lists may still include a large amount of information and usually in some random order. Some systems organize search results alphabetically or according to a level of match. However, sorting by an alphabet or a level of match might not reflect a relevance to the user of the items in the list.

BRIEF SUMMARY

The following presents a simplified summary of the disclosure in order to provide a basic understanding of some aspects. It is not intended to identify key or critical elements of the invention or to delineate the scope of the invention. The following summary merely presents some concepts of the disclosure in a simplified form as a prelude to the more detailed description provided below One or more aspects described herein relate to the sorting of items based on relevance. Relevance may, for example, include the consideration of popularity, proximity, recency and the like. In one or more examples, items to be sorted may be assigned an entity rank indicative of each item's popularity relative to other items of the same type. Alternatively or additionally, entity ranks may be determined on a single scale for all item types. The entity rank and/or other attributes may then be used to categorize each of the items in the list into a hierarchical group. Items within each group may then be sorted according to relevance in view of a variety of factors including entity rank, proximity, recency and the like. Once the items have been sorted in each group, the groups may be combined into a single results list organized by relevance. In one or more arrangements, relevance ranks may correspond to a value that may be converted to a specified scale (e.g., 0 to 1).

According to another aspect, entity rank may be calculated for a movie based on gross earnings, release date, number of awards won or nominated for, languages included, countries in which the movie was released and a number of votes.

According to another aspect, entity ranks may be calculated for a person based on movies or other roles that the person has had. For example, a ranking system may determine a movie-person relationship rank gained based on the entity rank of the movie, a role prominence and a role recency. The top 10 (or other predefined number) movie-person relationship rank gained may then be combined to determine an overall entity rank of the person.

According to another aspect, entity ranks may be determined at a time of indexing the entity (i.e., adding to a database). In some instances, the entity rank may be modified at a time of query. The modification of the rank may be in response to how a search result item matches a search query. In one example, if a content item such as a movie is returned as a search result because the search query matches an actor listed in the cast of the movie, the entity rank of the movie may be modified based on an entity rank of the actor. In some configurations, the modified entity rank will be lower than the original entity rank.

In other embodiments, the present invention can be partially or wholly implemented on a computer-readable medium, for example, by storing computer-executable instructions or modules, or by utilizing computer-readable data structures.

Of course, the methods and systems of the above-referenced embodiments may also include other additional elements, steps, computer-executable instructions, or computer-readable data structures. In this regard, other embodiments are disclosed and claimed herein as well.

The details of these and other embodiments of the present invention are set forth in the accompanying drawings and the description below. Other features and advantages of the invention will be apparent from the description and drawings, and from the claims.

BRIEF DESCRIPTION OF THE DRAWINGS

The present disclosure is illustrated by way of example and not limited in the accompanying figures in which like reference numerals indicate similar elements and in which:

FIG. 7 illustrates an example conversion table for determining a release date weight according to one or more aspects described herein.

FIG. 8 illustrates an example conversion table for determining a role recency factor according to one or more aspects described herein.

FIG. 9 illustrates an example conversion table for determining a role prominence factor based on casting order according to one or more aspects described herein.

DETAILED DESCRIPTION

Figure 1:
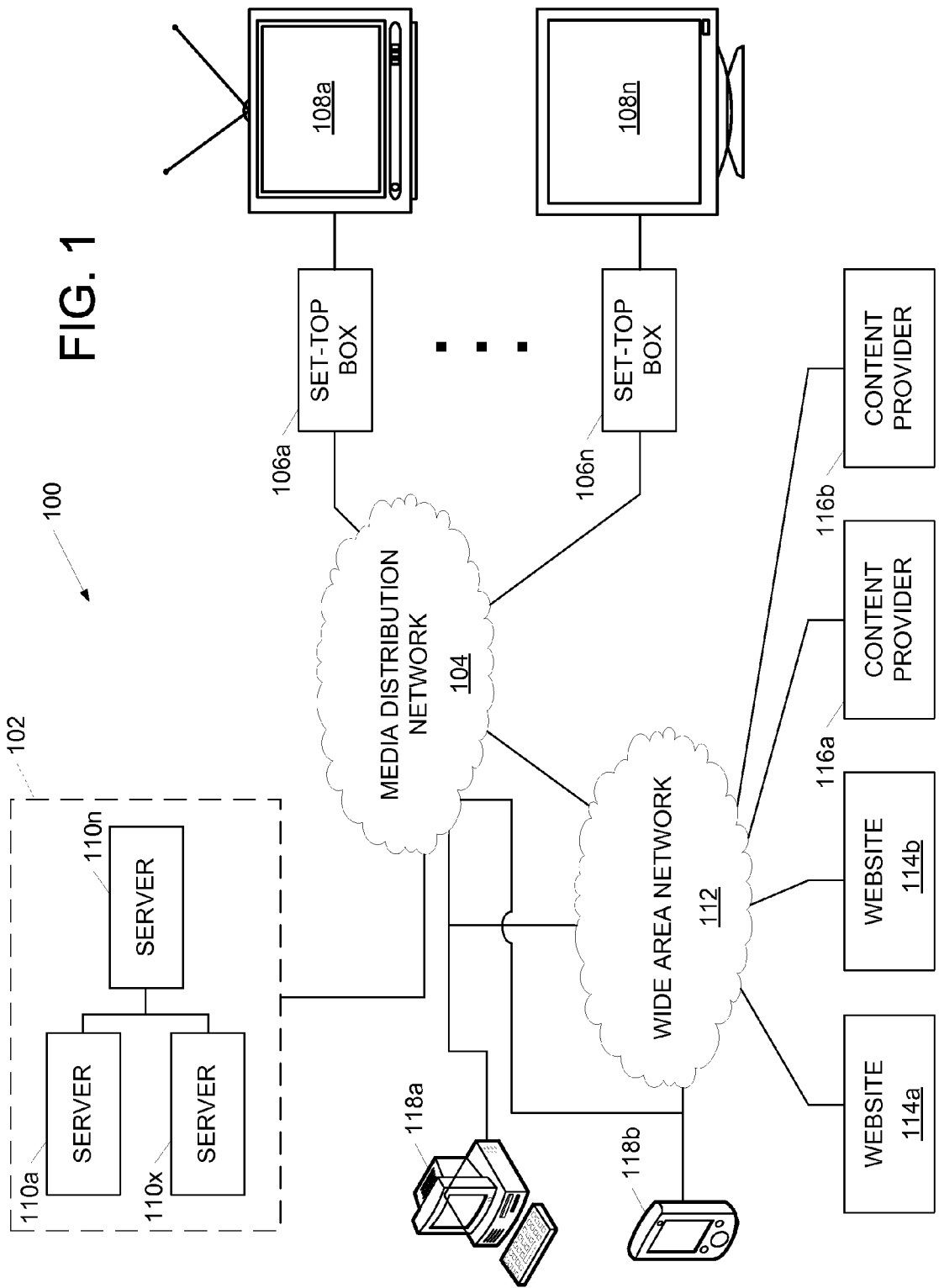
FIG. 1 illustrates an example network distribution system in which content items may be provided to subscribing clients.

FIG. 1 illustrates a content processing and distribution system 100 that may be used in connection with one or more aspects described herein. The distribution system 100 may include a headend 102, a network 104, set top boxes (STB) 106 and corresponding receiving devices (i.e., receiver, transceiver, etc.) 108. The distribution system 100 may be used as a media service provider/subscriber system wherein the provider (or vendor) generally operates the headend 102 and the network 104 and also provides a subscriber (i.e., client, customer, service purchaser, user, etc.) with the STB 106.

The STB 106 is generally located at the subscriber location such as a subscriber's home, a tavern, a hotel room, a business, etc., and the receiving device 108 is generally provided by the subscribing client. The receiving device 108 may include a television, high definition television (HDTV), monitor, host viewing device, MP3 player, audio receiver, radio, communication device, personal computer, media player, digital video recorder, game playing device, etc. The device 108 may be implemented as a transceiver having interactive capability in connection with the STB 106, the headend 102 or both the STB 106 and the headend 102.

The headend 102 is generally electrically coupled to the network 104, the network 104 is generally electrically coupled to the STB 106, and each STB 106 is generally electrically coupled to the respective device 108. The electrical coupling may be implemented as any appropriate hardwired (e.g., twisted pair, untwisted conductors, coaxial cable, fiber optic cable, hybrid fiber cable, etc.) or wireless (e.g., radio frequency, microwave, infrared, etc.) coupling and protocol (e.g., Home Plug, HomePNA, IEEE 802.11(a-b), Bluetooth, HomeRF, etc.) to meet the design criteria of a particular application. While the distribution system 100 is illustrated showing one STB 106 coupled to one respective receiving device 108, each STB 106 may be configured with the capability of being coupled to more than one device 108.

The headend 102 may include a plurality of devices 110 (e.g., devices 110a-110n) such as data servers, computers, processors, security encryption and decryption apparatuses or systems, and the like configured to provide video and audio data (e.g., movies, music, television programming, games, and the like), processing equipment (e.g., provider operated subscriber account processing servers), television service transceivers (e.g., transceivers for standard broadcast television and radio, digital television, HDTV, audio, MP3, text messaging, gaming, etc.), and the like. In one example, the headend 102 may generate and present (i.e., transmit, provide, pass, broadcast, send, etc.) the stream VIDIN. At least one of the devices 110 (e.g., a sender security device 110x), may include a security system.

In media distribution networks such as network 104 of FIG. 1, a substantial number of content items such as movies, television shows, music and articles may be made available to a subscriber or user. However, a user might only be interested in a subset of those content items. Accordingly, the user may wish to pare the list down to a number of content items of particular relevance or interest to him or her. Relevance may include consideration of user preferences, air time, content item attributes such as genre, age, actors/actresses, artist, popularity, formats available (e.g., high definition vs. standard definition) and the like. Additionally, the user may want to further sort the content items according to a level of interest or relevance to allow for efficient browsing of the various content items. For example, content items determined to be most relevant or of greatest interest to a user may be placed on the top of the list so that the user does not have to navigate or browse through numerous other content items before reaching the most relevant or interesting content items. In addition to content items, other types of entities may also be ranked. Entities, as used herein, may refer to a person, a content item, a genre, a sports team or any other uniquely identifiable object.

Figure 2:
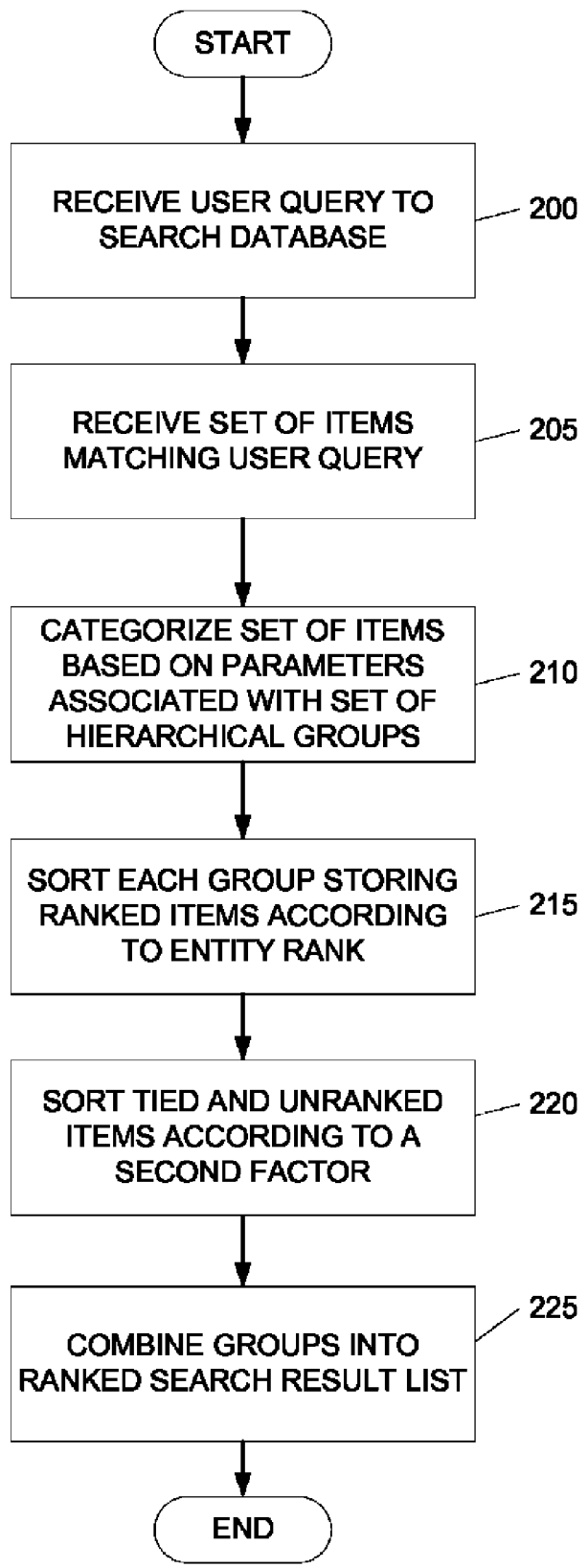
FIG. 2 illustrates an example method for determining a rank of items based on relevance according to one or more aspects described herein.

FIG. 2 illustrates an example method for ranking video content items according to user relevance. In step 200, a ranking module or system may receive a user query for searching a database of content items. In step 205, a set of content items may be received by the ranking module or system based on the user query. The user query may include words or phrases that are used to match one or more attributes of a content item (e.g., a title, names of people associated with the content item). Accordingly, those content items having a specified level of match with the user query may be returned. In step 210, the returned set of content items may be categorized according to a hierarchical set of groups or buckets. The categorization may be performed based on parameters associated with each of the groups.

Figure 3:
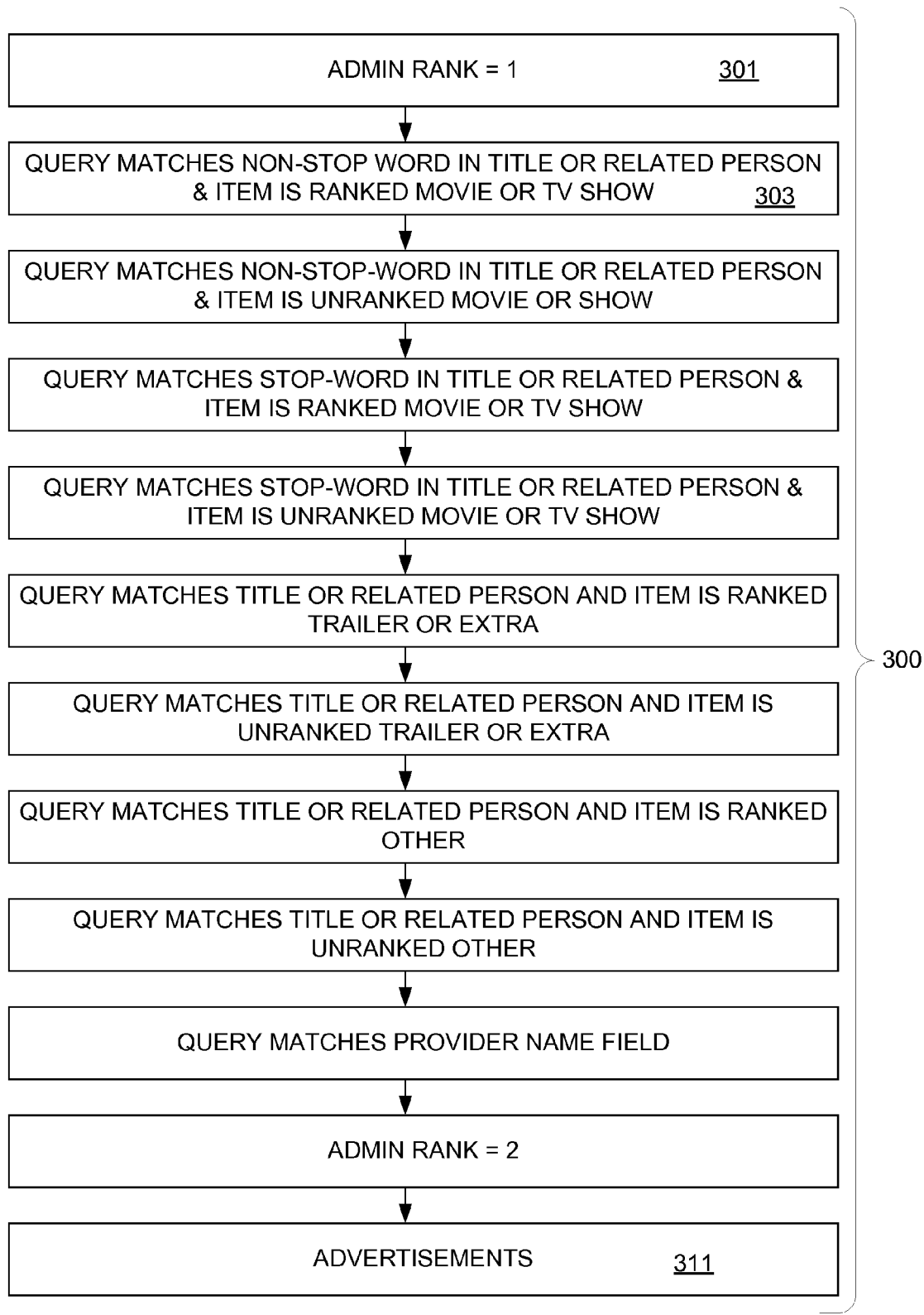
FIG. 3 illustrates an example hierarchy of groups that may be used to categorize a list of items to be ranked according to one or more aspects described herein.

FIG. 3 illustrates a hierarchy of groups in which content items may be categorized. The hierarchy may define which groups are considered more important or relevant than others. For example, in hierarchy 300, group 301 configured to store all content items or other entities with an administrative rank of 1 is considered the highest ranked group. Administrative ranks, as used herein, refer generally to ranks that are manually designated for a content item and may be used to affect the relevance rank thereof. In one or more arrangements, administrative ranks may outweigh, override or be considered more important than an entity rank. For example, an administrative rank of 1 may correspond to a user desire to raise the content item to the top of a ranked list regardless of entity rank or other considerations. The second highest ranked group 303 may be configured to store all content items with which a user query matches a non-stop-word in the title of the content item or a person associated therewith. In the illustrated hierarchy 300, a total of 12 groups are defined. The groups may vary by whether the content item is ranked or unranked, whether the content item corresponds to a trailer, extra or advertisement, whether a user query matches a provider name (or a portion thereof) and the like. A provider name may generally refer to a content provider such as G4, HBO, NBC, ABC and the like. The lowest group 311, for example, may include all advertisements. Categorization may begin with the highest ranked group 301 and trickle downward. Stated differently, a content item or other entity being ranked may first be evaluated against the parameters of the highest ranked group 301. If the content item does not match the parameters of group 301, the content item may then be compared with the second highest ranked group 303 and so on until the content item has been matched with a category.

As illustrated in FIG. 3, another parameter or attribute that may be considered for categorization is whether the search query matches a stop word or a non-stop word. Stop words refer generally to words which are filtered out prior to, or after, processing of natural language data (text). Stated differently, stop words are generally not evaluated for determining search results.

Referring again to FIG. 2, a ranking module may, after the content items have been categorized, sort each category configured to store ranked content items according to entity rank in step 215. In one or more configurations, each category or group may be sorted independently and/or separately of the other categories or groups. Entity rank, as used herein, refers generally to a popularity estimate of a particular entity based on various factors. Entity rank may be pre-determined using various formulas and methods described in further detail herein. In step 220, content items that are tied (i.e., have the same entity rank) and unranked content items may be sorted according to various factors. These factors may include a format of the content item, proximity (i.e., level of match) and recency (age of content item). The sorting may take these factors into account in a hierarchical manner. That is, conflicts or ties may be resolved by initially considering only format of the content item. If a tie persists, proximity may be evaluated and so on. If all factors are tied, the ranking of the two content items may be resolved using a database identifier (i.e., the content item having the higher database identifier is placed before the other). In step 225, the sorted groups may be combined according to the specified hierarchy into a search result list and provided to a querying user.

Evaluating proximity includes the analysis of how well a search query matches a title or other attribute of an entity. For example, if a query is "JU DI," a movie named "Juan Digs a Hole" may be ranked higher in terms of proximity than a movie named "Juan loves Diane." Additionally or alternatively, matches occurring earlier in an attribute field may be ranked above matches occurring later. In the above example query of "JU DI," a first movie named "Juan Loves Diane With All His Heart" may rank above a second movie entitled "With All His Heart, Juan Loves Diane," because the query string matches earlier in the title in the first movie. According to another aspect, if a query consists of two strings, entities having fewer words between the two matching strings may be ranked higher. For example, if a query consists of "Dig Hole," a first book entitled "Dig Me a Hole" may be ranked higher in proximity than a second book named "Dig Me a Really Really Really Big Hole." Another proximity consideration may include whether matching strings occur in reverse order of the order specified in the query.

In addition to proximity, recency and content format, other factors that may be taken into consideration for relevance ranking include expiration time (i.e., when programs are going to end), genre of the content item, user entitlements (i.e., whether a user has access to a content item based on their level of subscription and the like), field or attribute matching the user query, price of a content item, recording capability of a viewing device, search history of the user, viewing history of the user, program freshness (i.e., whether the content item is a first airing, newly released movie, season premiere or repeat) and user-designated favorites. Expiration time may be taken into consideration if some content items or types of content items such as sports programs become more exciting or interesting toward the end. Accordingly, programs that have a more recent expiration time may be ranked ahead of a later expiring program. In some arrangements, the field or attribute of a content item that matches the user query may be a ranking factor. In such instances, a content item having a title matching the user query may be ranked ahead of a content item having a director or genre matching the user query under the assumption that the title is more indicative of interest or relevance than the director or genre associated with the content.

Additionally or alternatively, the price of a content item may be used as a discriminating factor. In one example, cheaper programs may be ranked more highly than more expensive programs. Alternatively, more expensive programs may be ranked as more relevant than cheaper programs. Further and as discussed herein, programs having future air times may have a lower relevance ranking than programs that are currently airing or are soon to air. However, in some arrangements, if a viewing or receiving device has recording capability, the lower relevance ranking of a future airing program may be mitigated since the user is able to record the future program. Further, for each relevance factor, a user may specify how content items are to be ranked (e.g., whether a cheaper program is to be ranked above a more expensive program) or such rankings may be determined automatically based on a default setting.

Figure 4:
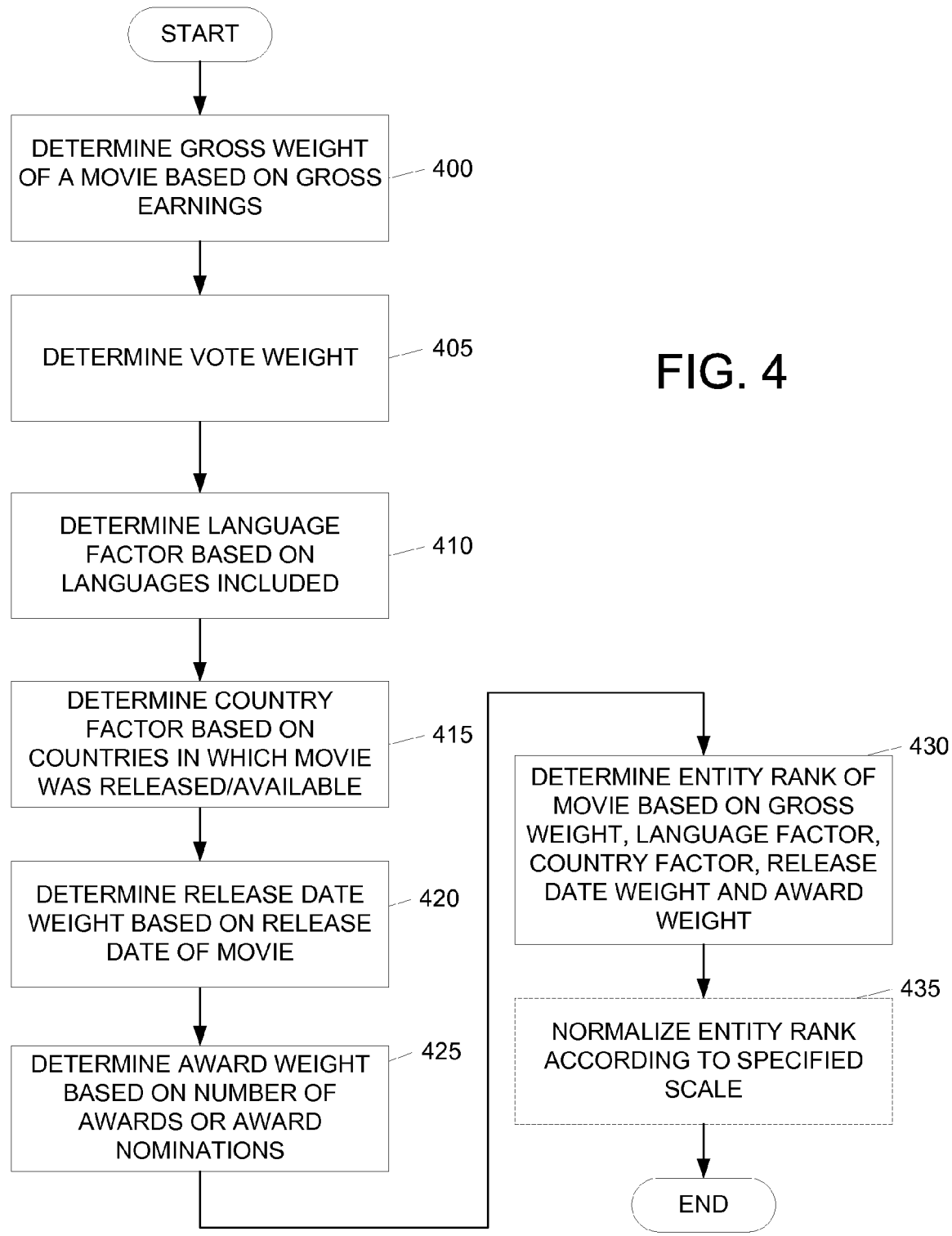
FIG. 4 illustrates an example method for determining an entity rank according to one or more aspects described herein.

FIG. 4 illustrates an example method for determining an entity rank for a movie. In step 400, a gross weight of the movie is determined. Gross weight relates to the gross earnings of the movies and may be determined based on a conversion table. For example, a conversion table may specify that gross earnings of $50 million or less corresponds to a gross weight of 0.5 while gross earnings of more than $500 million corresponds to a gross weight of 1.0. Earnings information for a movie may be obtained from various sources including movie information databases such as IMDB.COM. In step 405, a vote weight may be determined for the movie. Vote weight refers generally to a number of votes the movie has received. In one example, a vote may be indicative of approval or enjoyment of the movie. According to one embodiment, vote weight may be calculated according to the formula:

$$\text{vote weight} = \frac{\sqrt{\text{votes\_received}}}{400}$$

In step 410, a language factor may be determined based on the language or languages included in the movie. For example, if the movie includes English as the only language, the language factor may be 1.0. Alternatively, if the movie includes English, but not as the only language, the language factor may equal 0.75. In step 415, a country factor may be determined based on the number of countries in which the movie was released may be determined. The country factor may be dependent on whether a specific country is listed (e.g., the United States), whether countries speaking a specified language (e.g., English) are listed and the like. In one example, if the United States is the only country listed, the country factor may equal 1.0, while if only English-speaking countries are listed, the country factor may equal 0.95. In step 420, a release date weight may be determined based on a date on which the movie was released. FIG. 7 illustrates a table for converting a release age to a release date weight. In step 425, an award weight may be calculated based on the number of awards for which the movie has been nominated or awarded. In one example, the award weight may be calculated according to the formula:

award weight=# of awards nominated for or received/5

In step 430, an overall entity rank for the movie may be determined based on one or more of the gross weight, award weight, language factor, country factor, release date weight and the vote weight. For example, the entity rank may be determined according to the formula:

Entity Rank=((gross weight+award weight)*language factor*country factor*release date weight)+vote weight Optionally, in step 435, the entity rank may be normalized to a predefined scale such as 0 to 1. Entity ranks may be scaled according to a type of entity. Thus, in one configuration, movie entity ranks may be comparable with other movie entity ranks but not with person entity ranks or book entity ranks (i.e., different scales are used). Alternatively, a global or universal scale may be used in which entity ranks for different types of entities are converted to a universal scale. For example, a linear conversion may be used to translate entity-type specific ranks to a universal rank.

The above described method for determining entity rank for movies may be applied in similar fashion to other types of content items including books, television shows, music and the like. One or more factors may be eliminated or replaced according to the type of content item. For example, instead of using a gross earnings weight for television shows, a Nielsen rating weight may be used instead. In one embodiment, television shows may be assigned an entity rank based on the formula:

Entity Rank=log(1.0+number of query matches), where the number of query matches may correspond to a number of television programs matching a user's search query in a television guide database or a TV planner search log. A TV planner may include an interface such as a website that presents television schedules in a specified format (e.g., a grid). The planner may further include a search bar that allows users to search for a program by entering various search criteria. Accordingly, the planner search log may store the queries that are entered into the search interface. In one or more arrangements, a planner search log may further store or record user interactions with search results or items in the TV planner. For example, the TV planner search log may store a number of clicks or selections of programs. Such information may be useful for disambiguating between programs that share a title. For example, if a user searches for "MOVIE 123" and two movies exist with the name "MOVIE 123," the system may look to a number of clicks to determine which of the two movies is a closer match. This technique assumes that given two different programs that share a name, the one more people click on should be considered to be the program people are looking for.

In one or more arrangements, relevance ranks may correspond to a numerical value. For example, all content items categorized to a first category may be given an initial value of 0.8 while all content items categorized to a second group or category may be given an initial value of 0.7. The values may be incremented or decremented based on the factors described herein such as entity rank, recency, proximity and the like. In one or more configurations, a value of a content item might not be incremented above or decremented below a threshold value so that content items in the first group remain above (or below) the second group according to the specified hierarchy.

In addition to movies and other content items, individuals may also be given an entity rank. In particular, individuals associated with movies and other content items may be assigned an entity rank that is determined relative to the content item to which they are associated. For example, an actor may be assigned an entity rank that is derived from an entity rank of a movie in which he or she had a role, the role's recency and the role's prominence (e.g., leading actor vs. an extra). Alternatively, an entity rank for a person may be determined independently of movie or television roles.

Figure 5:
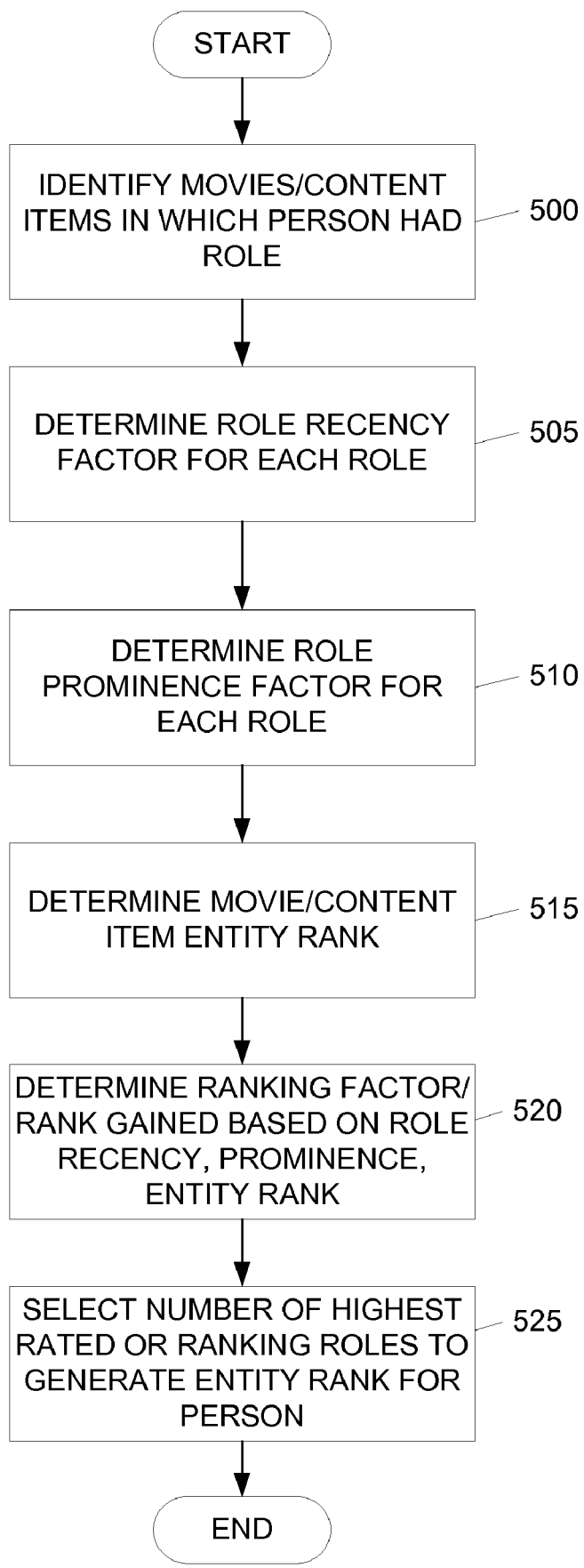
FIG. 5 illustrates an example method for determining a relevance rank according to one or more aspects described herein.

FIG. 5 illustrates an example method for determining an entity rank for a person based on the person's role or role(s) in content items. In step 500, a ranking system may identify each movie or other content item in which the person had a role. Such information may be obtained from movie or content information databases such as IMDB or AMG. In step 505, the ranking system may determine a role recency factor based on when a particular movie role the occurred. FIG. 8 illustrates a table that converts the time at which the role occurred to a role recency factor. For example, roles that occurred in 2007 or later may be assigned a role recency factor of 2.5 while roles that occurred between 2004 and 2005 may be assigned a factor of 1.25. Referring again to FIG. 5, the ranking system may subsequently determine a role prominence factor in step 510. Role prominence may be evaluated differently for acting, directing and producing. In one example, all producing roles may be assigned a prominence factor of 0.1. Directing roles, on the other hand, may be assigned differing values depending on whether the movie for which the person was a director was nominated for a best director award. If so, the role prominence factor may be assigned a value of 0.4. If not, the role prominence factor may be assigned a value of 0.2.

Acting roles, on the other hand, may be assigned a factor value based on the role's casting order in the movie. For example, if the cast order is between 1 and 3, inclusive, the prominence factor may be assigned a value of 1. Any roles having a cast order over 3 may be assigned a value of 0.1. FIG. 9 illustrates a table that specifies factor values corresponding to cast order and other parameters. For example, a parameter other than cast order that may be considered in determining a level of acting renown or prominence is whether the individual was named in one list versus another (e.g., All Movie Guide list versus Internet Movie Database list). A role may be evaluated in a hierarchical order according to table 900. That is, the role may first be evaluated against parameters 902. If the role does match, the corresponding value may be assigned (e.g., 1) and the comparison process may end. If, however, the role does not match parameters 902, the role may be compared to parameters 904 and so on until a match is found.

Referring again to FIG. 5, if an individual is both an actor in a movie and the director, two separate person-movie relationships may be generated. In step 515, the movie or content item's entity rank may be determined. A ranking factor or rank gained by the person for the movie or other content item role may then be determined in step 520. The rank gained may, for example, be calculated by taking the multiplicative product of the recency factor, the role prominence factor and the entity of the movie or other content item.

The above process (i.e. steps 505-520) may be repeated for each movie or other content item identified in step 500. In step 525, a predefined number of highest rated or ranking roles (i.e., person-movie relationships) may be selected and combined to generate an entity rank for the individual. In one example, the rank gained for each of the highest person-movie relationships may be added together to derive the entity rank of the person.

In various circumstances, an entity rank for a content item may be modified in response to a particular search query. In one example, if a user searches for "Actor One" and a movie matches the search because actor Actor One has a role in the movie, the rank for the movie may be modified because the match was not a match of the movie's title, but rather a cast or person attribute. Accordingly, the movie's entity rank may be modified based on an entity adjustment coefficient and a cast adjustment coefficient. The entity adjustment coefficient may be defined as: the movie's original entity rank/(the original entity rank+30). The cast adjustment coefficient, on the other hand, may be computed based on a conversion table. For example, a first or second cast order may correspond to a cast adjustment coefficient of 1.0, a third cast order may correspond to a coefficient of 0.33, a fourth cast order may correspond to a coefficient of 0.1 and cast order above 4 may correspond to the formula: $1/(2*(N-1)^2)$, where N is the cast order. Once the cast adjustment and entity adjustment coefficients have been determined, the adjusted entity rank may be calculated based on a formula such as original entity rank*cast adjustment coefficient*entity adjustment coefficient. Various other algorithms or formulas may also be used.

Figure 6:
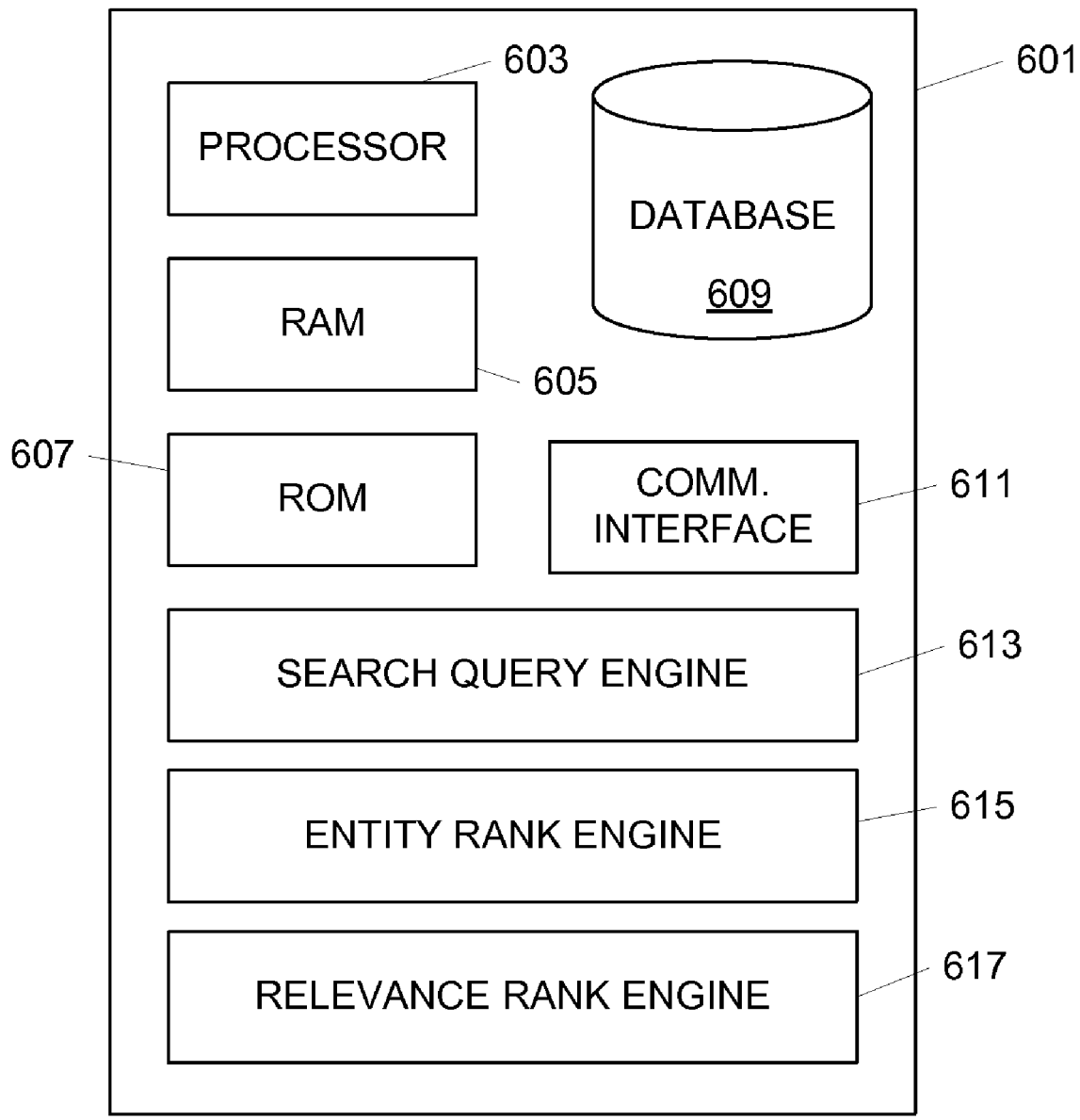
FIG. 6 illustrates a block diagram of an example ranking system according to one or more aspects described herein.

FIG. 6 illustrates a block diagram of a system configured to rank entities according to multiple factors. Ranking system 601 may include a processor 603 configured to execute instructions and carry out mathematical calculations, memory such as random access memory (RAM) 605, read only memory (ROM) 607 and database 609. Database 609 may be configured to store a variety of information such as application data, user preference information, entity information, entity identifiers, content items, application programming and the like. Communication interface 611 may be included in system 601 so that external information (e.g., data from external websites or databases) may be accessed. System 601 includes three engines for ranking search results according to user relevance: query engine 613, entity rank engine 615 and relevance rank engine 617. Query engine 613 may be configured to receive a search query from a user and determine a list of matching or potentially matching items. The list may then be fed into relevance rank engine 617 that is configured to evaluate each item to determine a relevance rank according to aspects described herein. Part of the relevance rank processing may include the determination of an entity rank. Entity ranks may be generated by entity rank engine 615 and stored in database 609 for retrieval by various other modules of ranking system 601. Entity rank engine 615 and/or relevance rank engine 617 may be configured to modify entity ranks in response to a user query if necessary. The modules and components of system 601 may exist in the same physical device or may be located in different devices and/or locations. Additionally, the modules and components may include hardware, software, firmware and/or combinations thereof.

Figure 10:
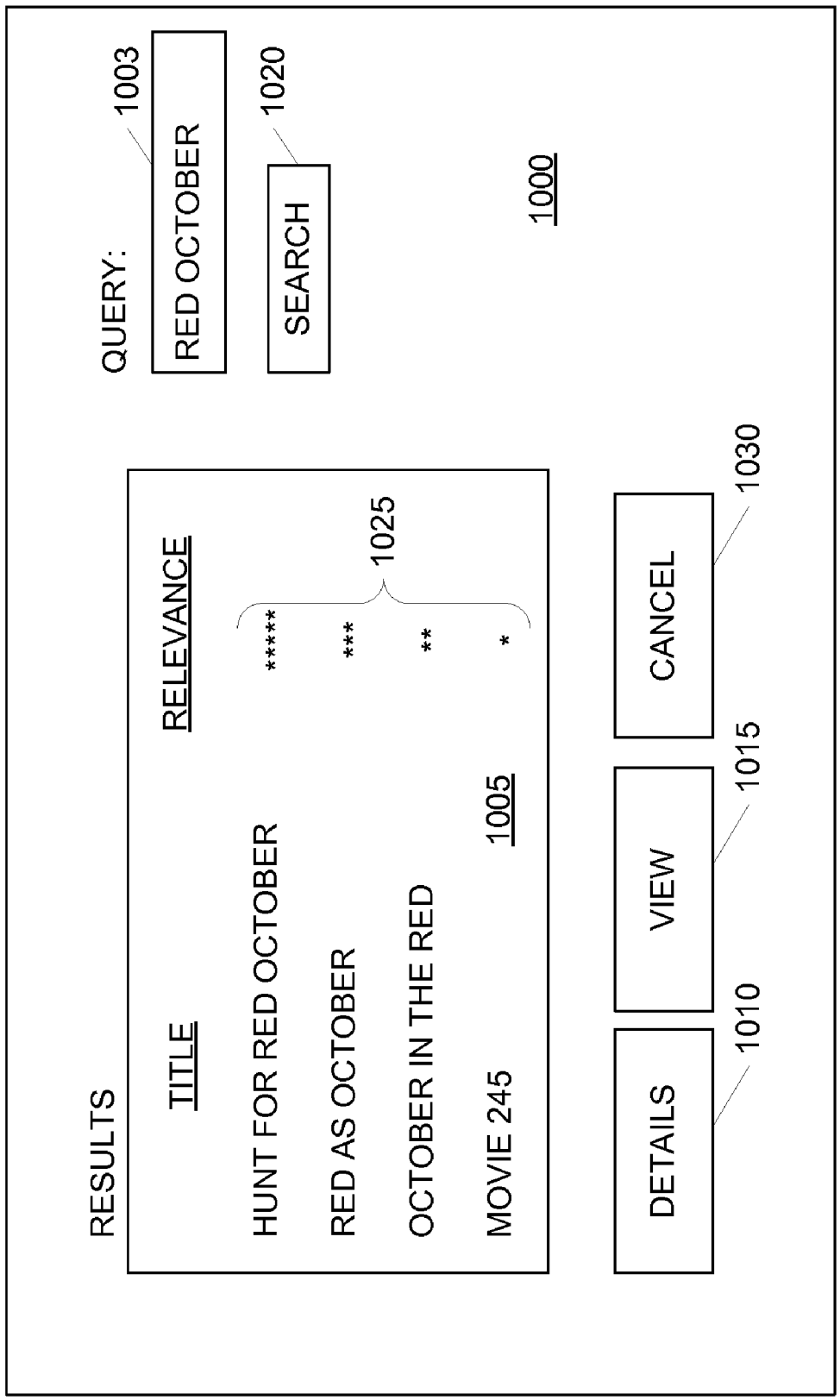
FIG. 10 illustrates an example search results interface according to one or more aspects described herein.

FIG. 10 illustrates an example search results interface displaying a list of results matching a user query. Interface 1000 may include a search query box 1003 in which a user's current query is displayed and modifiable. Interface 1000 may further include a list 1005 of search results ordered according to the methods and aspects described herein. For example, in response to the user's query of "RED OCTOBER," the interface 1000 may provide of list 1005 that includes results such as "HUNT FOR RED OCTOBER," "RED AS OCTOBER," "OCTOBER IN THE RED" and "MOVIE 245." Based on the various ranking mechanisms described, "RED AS OCTOBER" may be ranked behind "HUNT FOR RED OCTOBER" based, at least in part, on proximity. "MOVIE 245" may be ranked, but placed in the lowest relevance position because RED OCTOBER may match an actor's name, rather than a title. Accordingly, MOVIE 245's entity rank may have been modified in response. Details option 1010 may allow a user to view a full description of the movie and view ranking details while view option 1015 may allow the user to watch the content item. Search option 1020 may be provided so that a user may reformulate and reexecute his or her search. Cancel option 1030 may return a user to a previous screen. Additionally or alternatively, list 1005 may include an indicator 1025 of relevance.

According to one or more aspects, a query might not be spell checked if it is assumed that users will be copying/pasting program names directly into a search query field. Thus, some processing power and time may be saved by removing the need for spell checking. Alternatively or additionally, a search and rank system might only look for exact matches between queries and program names.

The methods and features recited herein may further be implemented through any number of computer readable media that are able to store computer readable instructions. Examples of computer readable media that may be used include RAM, ROM, EEPROM, flash memory or other memory technology, CD-ROM, DVD or other optical disk storage, magnetic cassettes, magnetic tape, magnetic storage and the like.

Additionally or alternatively, in at least some embodiments, the methods and features recited herein may be implemented through one or more integrated circuits (ICs). An integrated circuit may, for example, be a microprocessor that accesses programming instructions or other data stored in a read only memory (ROM). In some such embodiments, the ROM stores programming instructions that cause the IC to perform operations according to one or more of the methods described herein. In at least some other embodiments, one or more the methods described herein are hardwired into an IC. In other words, the IC is in such cases an application specific integrated circuit (ASIC) having gates and other logic dedicated to the calculations and other operations described herein. In still other embodiments, the IC may perform some operations based on execution of programming instructions read from ROM or RAM, with other operations hardwired into gates and other logic of IC. Further, the IC may output image data to a display buffer.

Although specific examples of carrying out the invention have been described, those skilled in the art will appreciate that there are numerous variations and permutations of the above-described systems and methods that are contained within the spirit and scope of the invention as set forth in the appended claims. Additionally, numerous other embodiments, modifications and variations within the scope and spirit of the appended claims will occur to persons of ordinary skill in the art from a review of this disclosure.

We claim:

1. A computer-implemented method for ranking content items, the method comprising:
    receiving a list of a plurality of content items;
    categorizing a first content item in a first group of a hierarchical set of groups, wherein the hierarchical set of groups is arranged in accordance with a level of relevance to a user;
    sorting the first group including the first content item and a second content item based on a determined entity rank for each content item independently of sorting a second group of the hierarchical set of groups, wherein the second group includes a third content item of the plurality of content items and wherein entity rank indicates content item popularity relative to other content items of a same type and wherein determining entity rank for content items of a first content type is performed based on a first set of content item attributes and determining entity rank for content items of a second content type is performed based on a second set of content item attributes different from the first set of content item attributes; and
    generating a ranked list of content items by combining the first group with the second group, wherein the second group is ranked lower than the first group and wherein content items belonging to the first group are ranked higher than content items belonging to the second group in the ranked list.

2. The computer-implemented method of claim 1, wherein categorizing the first content item includes determining whether the first content item is assigned a first entity rank.

3. The computer-implemented method of claim 2, wherein a third group of the hierarchical set of groups corresponds to content items not assigned any entity ranks.

4. The computer-implemented method of claim 2, wherein the first content item is assigned the first entity rank and a user specified rank configured to affect a ranking of the first content item in the ranked list.

5. The computer-implemented method of claim 4, further comprising:
    prior to determining whether the first content item is assigned the first entity rank, determining whether the user specified rank of the first content item is equal to a specified value; and
    in response to determining that the user specified rank of the first content item is equal to the specified value, categorizing the first content item in a third group of the plurality of hierarchical groups.

6. The computer-implemented method of claim 2, wherein determining whether the first content item is assigned the first entity rank includes determining whether the first content item corresponds to a specified type of content item.

7. The computer-implemented method of claim 6, wherein the specified type is a movie.

8. The computer-implemented method of claim 1, further comprising categorizing the second content item in the first group and wherein sorting the first group including the first content item and the second content item based on entity rank includes:
    comparing the first entity rank with a second entity rank associated with the second content item;
    determining whether the first entity rank equals the second entity rank; and
    in response to determining that the first entity rank equals the second entity rank, sorting the first and second content items based on a factor other than entity rank, otherwise
    sorting the first and second items based on the first and second entity ranks without using the factor other than entity rank.

9. The computer-implemented method of claim 8, wherein the factor includes a similarity of the first content item to a content item search query.

10. A computer-implemented method comprising:
    receiving a search query;
    determining a list of content items matching the search query; and
    categorizing the list of content items into a plurality of hierarchical groups based on a type of the content item and whether a content item is associated with an entity rank, wherein the entity rank is indicative of a popularity of the content item relative to other content items of a same type as the content item, wherein categorizing the list of content items further includes:
        categorizing a first content item into a first group upon determining that the first content item is not associated with an entity rank; and
        categorizing a second content item into a second group upon determining that the second content item is associated with an entity rank.

11. The computer-implemented method of claim 10, further comprising sorting content items belonging to the second group based on a proximity of each of the content items to the search query.

12. The computer-implemented method of claim 10, wherein categorizing the list of content items into the plurality of hierarchical groups is further based on an administrative rank of the content item.

13. The computer-implemented method of claim 10, wherein categorizing the list of content items includes categorizing the second content item and a third content item in the second group and wherein the method further includes:
    determining whether a first entity rank of the second content item is equal to a second entity rank of the third content item; and
    in response to determining that the first entity rank is equal to the second entity rank, ranking the second content item and the third content item based on a proximity to the search query, otherwise
    ranking the second and third content items based on the first and second entity ranks without using the proximity to the search query.

14. The computer-implemented method of claim 13, wherein the search query includes at least two separate characters and wherein the proximity to the search query includes an order of the at least two separate characters.

15. The computer-implemented method of claim 10, further comprising:
    determining whether the search query matches a specified attribute of the second content item; and
    in response to determining that the search query matches the specified attribute of the content item, modifying a predetermined entity rank of the second content item.

16. The computer-implemented method of claim 15, wherein the second content item includes video and wherein the specified attribute is a person having a role in the video and wherein the predetermined entity rank is modified based on a cast order of the person in the video.

17. A computer-implemented method for determining an entity rank, the method comprising:
    identifying a first content item in which an individual has a first role;
    determining a first entity rank indicative of a popularity of the first content item;
    determining a first ranking value based on the first entity rank, a recency of the first role and a prominence of the first role in the first content item; and
    generating a second entity rank indicative of a popularity of the individual based on the first ranking value.

18. The computer-implemented method of claim 17, wherein the first content item includes video and wherein determining the first entity rank includes determining a gross earnings of the video.

19. The computer-implemented method of claim 17, wherein the first content item includes video and wherein determining the first entity rank includes determining a number of awards won by the video and a number of awards for which the video was nominated.

20. The computer-implemented method of claim 17, further comprising determining the prominence of the first role based on a type of role the individual played in the first content item.

21. The computer-implemented method of claim 20, wherein the type of role includes director.

22. The computer-implemented method of claim 17, further comprising:
    determining a third entity rank indicative of a popularity of a second content item in which the individual has a second role; and
    determining a second ranking value based on the third entity rank, a recency of the second role and a prominence of the second role,
    wherein determining the second entity rank includes adding the first ranking value to the second ranking value.

23. An apparatus comprising:
    a processor; and
    memory storing computer readable instructions that, when executed, cause the apparatus to:
        receive a list of a plurality of content items;
        categorize the first content item in a first group of a hierarchical set of groups wherein, the hierarchical set of groups are arranged in accordance with a level of relevance to a user;
        sort the first group including the first content item and a second content item based on a determined entity rank for each content item independently of sorting a second group of the hierarchical set of groups, wherein the second group includes a third content item of the plurality of content items and wherein entity rank indicates content item popularity relative to other content items of a same type and wherein determining entity rank for content items of a first content type is performed based on a first set of content item attributes and determining entity rank for content items of a second content type is performed based on a second set of content item attributes different from the first set of content item attributes; and generate a ranked list of content items by combining the first group with the second group, wherein the second group is ranked lower than the first group and wherein content items belonging to the first group are ranked higher than content items belonging to the second group in the ranked list.

24. The apparatus of claim 23, wherein the apparatus includes a head-end of a media distribution system and wherein the categorization and sorting is performed by the head-end.

25. The apparatus of claim 23, wherein the apparatus includes a set-top box and wherein the categorization and sorting is performed by the set-top box.

26. The apparatus of claim 23, wherein categorizing the first content item includes determining whether the first content item is assigned a first entity rank.

27. The apparatus of claim 26, wherein the hierarchical set of groups includes a third group corresponding to content items not assigned any entity ranks.

28. One or more computer readable media storing computer readable instructions that, when executed, cause an apparatus to:

receive a list of a plurality of content items;

categorize the first content item in a first group of a hierarchical set of groups wherein, the hierarchical set of groups are arranged in accordance with a level of relevance to a user;

sort the first group including the first content item and a second content item based on a determined entity rank of each of the content items independently of sorting a second group of the hierarchical set of groups, wherein the second group includes a third content item of the plurality of content items and wherein entity rank indicates content item popularity relative to other content items of a same type and wherein determining entity rank for content items of a first content type is performed based on a first set of content item attributes and determining entity rank for content items of a second content type is performed based on a second set of content item attributes different from the first set of content item attributes; and generate a ranked list of content items by combining the first group with the second group, wherein the second group is ranked lower than the first group and wherein content items belonging to the first group are ranked higher than content items belonging to the second group in the ranked list.

29. The one or more computer readable media of claim 28, wherein the computer readable instructions, when executed, further cause the apparatus to categorize the second content item in the first group and wherein sorting the first group including the first content item and the second content item based on entity rank includes:

comparing the first entity rank with a second entity rank associated with the second content item;

determining whether the first entity rank equals the second entity rank; and in response to determining that the first entity rank equals the second entity rank, sorting the first and second content items based on a factor other than entity rank, otherwise sorting the first and second content items based on the first and second entity ranks without regard to the factor other than entity rank.

30. The one or more computer readable media of claim 29, wherein the factor includes a similarity of the first content item to a content item search query.

31. The one or more computer readable media of claim of claim 28, wherein sorting the first group further includes sorting the first and second content items based on a proximity to a search query for which the plurality of content items matched.

32. The one or more computer readable media of claim 31, wherein proximity to the search query includes an order in which the search query matches the first and second content items.

33. A system comprising:

a first apparatus configured to:

receive a search query from a second apparatus located remote from the first apparatus in a media distribution network, determine a list of content items matching the search query, categorize a first content item of the list of content items in a first group of a hierarchical set of groups wherein, the hierarchical set of groups are arranged in accordance with a level of relevance to a user, sort the first group including the first content item and a second content item based on a determined entity rank of each of the content items independently of sorting a second group of the hierarchical set of groups, wherein the second group includes a third content item of the plurality of content items and wherein entity rank indicates content item popularity relative to other content items of a same type and wherein determining entity rank for content items of a first content type is performed based on a first set of content item attributes and determining entity rank for content items of a second content type is performed based on a second set of content item attributes different from the first set of content item attributes, and generate a ranked list of content items by combining the first group with the second group, wherein the second group is ranked lower than the first group and wherein content items belonging to the first group are ranked higher than content items belonging to the second group in the ranked list; and the second apparatus configured to:

transmit the search query to the first apparatus;

receive the ranked list of content items from the first apparatus; and cause the ranked list of content items to be displayed on a display device.

34. The system of claim 33, wherein the service provider is configured to sort the first group further by sorting the first and second content items based on a proximity to a search query for which the plurality of content items matched.

35. The system of claim 34, wherein proximity to the search query includes an order in which the search query matches the first content item.

36. The system of claim 33, wherein the first apparatus includes a service provider.

37. The system of claim 33, wherein the first apparatus includes a set-top box.

38. The system of claim 37, wherein the second apparatus includes a service provider.

* * * * *